(12) United States Patent
Disteldorf et al.

(10) Patent No.: US 11,680,011 B2
(45) Date of Patent: Jun. 20, 2023

(54) COATED ARTICLE WITH IR REFLECTING LAYER AND MULTILAYER OVERCOAT FOR REDUCING FINGERPRINTS

(71) Applicant: GUARDIAN EUROPE S.À R.L., Bertrange (LU)

(72) Inventors: Bernd Disteldorf, Bertrange (LU); Jochen Butz, Bertrange (LU); Uwe Kriltz, Bertrange (LU)

(73) Assignee: GUARDIAN EUROPE S.À R.L., Bertrange (LU)

( * ) Notice: Subject to any disclaimer, the term of this patent is extended or adjusted under 35 U.S.C. 154(b) by 0 days.

(21) Appl. No.: 17/375,510

(22) Filed: Jul. 14, 2021

(65) Prior Publication Data

US 2022/0017410 A1    Jan. 20, 2022

Related U.S. Application Data

(60) Provisional application No. 62/705,765, filed on Jul. 15, 2020.

(51) Int. Cl.

| | | |
|---|---|---|
| *B32B 15/04* | (2006.01) | |
| *B32B 17/06* | (2006.01) | |
| *C03C 17/36* | (2006.01) | |
| *B32B 17/10* | (2006.01) | |

(52) U.S. Cl.
CPC .... *C03C 17/3636* (2013.01); *B32B 17/10009* (2013.01); *B32B 17/10174* (2013.01); *C03C 17/366* (2013.01); *C03C 17/3618* (2013.01)

(58) Field of Classification Search
CPC .................................. C03C 17/366
USPC .............................. 428/426, 428, 432, 434
See application file for complete search history.

(56) References Cited

U.S. PATENT DOCUMENTS

| | | |
|---|---|---|
| 5,770,321 A | 6/1998 | Hartig et al. |
| 5,800,933 A | 9/1998 | Hartig |
| 6,524,714 B1 | 2/2003 | Neuman et al. |
| 6,541,084 B2 | 4/2003 | Wang |
| 6,576,349 B2 | 6/2003 | Lingle |

(Continued)

FOREIGN PATENT DOCUMENTS

| | | |
|---|---|---|
| EP | 0937013 B1 | 11/2002 |
| EP | 3004014 B1 | 8/2017 |

(Continued)

OTHER PUBLICATIONS

International Search report and Written Opinion received for PCT application No. PCT/IB2021/056365, dated Oct. 11, 2021, 10 pages.

*Primary Examiner* — Lauren R Colgan

(57) ABSTRACT

A low-E (low emissivity) coating includes a multilayer overcoat designed for reducing fingerprints. The multilayer overcoat includes a layer comprising an oxide of zirconium (e.g., $ZrO_2$) sandwiched between and contacting first and second layers of or including silicon nitride (e.g., $Si_3N_4$, $SiO_xN_y$, $SiZrO_xN_y$, or the like). The uppermost layer comprising silicon nitride modifies the surface energy of the layer comprising the oxide of zirconium so as to make the uppermost surface of the coating more hydrophilic, thereby reducing or minimizing interaction between zirconium oxide and finger oil to reduce fingerprints on the uppermost surface of the coating.

21 Claims, 5 Drawing Sheets

(56) References Cited

U.S. PATENT DOCUMENTS

| | | | |
|---|---|---|---|
| 8,263,227 B2* | 9/2012 | Disteldorf | C03C 17/3652 428/428 |
| 8,506,001 B2* | 8/2013 | Benito | C03C 17/3618 428/428 |
| 9,017,821 B2* | 4/2015 | Imran | C03C 17/3652 428/688 |
| 9,499,437 B2* | 11/2016 | Imran | C03C 17/3644 |
| 10,301,215 B1* | 5/2019 | Xu | C03C 17/3681 |
| 2003/0150711 A1 | 8/2003 | Laird | |
| 2006/0121290 A1* | 6/2006 | Chonlamaitri | C23C 14/0676 428/428 |
| 2009/0324967 A1* | 12/2009 | Disteldorf | C03C 17/3618 428/428 |
| 2011/0262726 A1* | 10/2011 | Knoll | C03C 17/3636 428/428 |
| 2019/0055157 A1 | 2/2019 | Hagen et al. | |

FOREIGN PATENT DOCUMENTS

| | | |
|---|---|---|
| WO | 2005000578 A2 | 1/2005 |
| WO | 2006020641 A2 | 2/2006 |
| WO | 2013096080 A1 | 6/2013 |

* cited by examiner

| | ZrSiOxNy | ZnAlOx | Ag | NiCrOx | TiOx | ZnAlOx | Si3Nx (d in nm) | ZrOx (d in nm) | Si3Nx (d in nm) | ZrSi (d in nm) | Zr-Si co sputtered (d in nm) | Comments | Rms | σrough | dry brush | wet brush | fingerprint |
|---|---|---|---|---|---|---|---|---|---|---|---|---|---|---|---|---|---|
| | (d in nm) | (d in nm) | (SR 4Ω/sq) | (d in nm) | (d in nm) | (d in nm) | (11ml/kW N2) | (0.8ml/kW O2) | (11ml/kW N2) | (7ml/kW N2/ 5ml/kW O2) | 60/40 power ratio N2+O2 | | nm | nm | 10 cycles | 500 cycles | |
| 2312 | 18 | 21 | | 3 | 6.5 | 16 | 19 | | | | | baseline Si3Nx | 1.042 | 0.83 | 4 | 2 | 1 |
| 2314 | 18 | 21 | | 3 | 6.5 | 16 | 19 | 5 | | | | baseline Si3Nx+ZrOx | 0.411 | 0.323 | 1 | 2 | 3 |
| 2315 | 18 | 21 | | 3 | 6.5 | 16 | 19 | 7 | 3 | | | | 0.875 | 0.706 | 4 | 2 | 1 |
| 2316 | 18 | 21 | | 3 | 6.5 | 16 | 19 | 4 | 3 | | | | 1.293 | 0.883 | 2 | 2 | 1 |
| 2317 | 18 | 21 | | 3 | 6.5 | 16 | 19 | | | | 8 | | 1.041 | 0.836 | 2 | 2 | 2 |
| 2318 | 18 | 21 | | 3 | 6.5 | 16 | 19 | 7 | | | 3 | | 0.989 | 0.731 | 2 | 2 | 2 |
| 2319 | 18 | 21 | | 3 | 6.5 | 16 | 19 | 7 | | | 5 | | 3.474 | 2.77 | 1 | 2 | 2 |
| 2322 | 18 | 21 | | 3 | 6.5 | 16 | 19 | | | 8 | | | 0.924 | 0.708 | 1 | 2 | 3 |
| 2323 | 18 | 21 | | 3 | 6.5 | 16 | 19 | 7 | | 3 | | | 0.526 | 0.419 | 2 | 2 | 2 |
| 2324 | 18 | 21 | | 3 | 6.5 | 16 | 19 | 7 | | 5 | | | 0.613 | 0.467 | 2 | 1 | 2 |

Overcoat matrix DoE December 2-6, 2019 LAVC

COATED ARTICLE WITH IR REFLECTING LAYER AND MULTILAYER OVERCOAT FOR REDUCING FINGERPRINTS

This application claims the benefit of 62/705,765 filed on Jul. 15, 2020, the entire contents of which are hereby incorporated herein by reference.

This invention relates to a coated article having a low-emissivity (low-E) coating including an infrared (IR) reflecting layer of or including a material such as silver or the like. The low-E coating is designed so that the coated article can realize one or more of: high visible transmission, consistent and low emissivity values, thermal stability upon optional heat treatment such as thermal tempering, a low U-value, and desirable coloration and/or reflectivity values. The coating includes a multilayer overcoat designed for reducing fingerprints. The multilayer overcoat includes a layer comprising an oxide of zirconium (e.g., $ZrO_2$) sandwiched between and contacting first and second layers of or including silicon nitride (e.g., $Si_3N_4$, $SiO_xN_y$, $SiZrO_xN_y$, or the like). The layers of or including silicon nitride may be doped with metal such as aluminum in certain example embodiments. The uppermost layer comprising silicon nitride modifies the surface energy of the layer comprising the oxide of zirconium so as to make the uppermost surface of the coating more hydrophilic, thereby reducing or minimizing interaction between zirconium oxide and finger oil to reduce fingerprints on the uppermost surface of the coating. In this respect, the uppermost layer comprising silicon nitride causes the contact angle of the coating to decrease (compared to if the uppermost layer comprising silicon nitride was not provided) thereby improving wettability and cleanability of the coated article. For example, in certain example embodiments, the uppermost layer comprising silicon nitride provided over the layer comprising zirconium oxide causes the contact angle of the coating to decrease (compared to if the uppermost layer comprising silicon nitride was not provided, and thus compared to if the zirconium oxide was the uppermost layer of the coating) by at least 15 degrees, more preferably by at least 20 degrees, and most preferably by at least 25 degrees (e.g., from about 70 degrees to about 35 degrees). Coated articles herein may be used in the context of insulating glass (IG) window units, or in other suitable applications such as monolithic window applications, laminated windows, and/or the like.

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like. In certain example instances, designers of coated articles often strive for a combination of high visible transmission, desirable color, low emissivity (or emittance), low sheet resistance ($R_s$), and/or low U-values in the context of IG window units. High visible transmission and desired coloration may permit coated articles to be used in applications where these characteristics are desired such as in IG or vehicle window applications, whereas low emissivity and low sheet resistance permit such coated articles to block significant amounts of IR radiation so as to reduce for example undesirable heating of vehicle or building interiors.

Low-E coatings are typically deposited on a glass substrate by sputtering. Emissivity and/or sheet resistance values of a coating or coated article are driven in large part by the IR reflecting layer(s) which is/are typically made of silver or the like. Zirconium oxide (e.g., $ZrO_2$) has been used as an overcoat in low-E coating applications. However, it has been found that zirconium oxide overcoats tend to collect fingerprints, which is problematic with respects to manufacturing and aesthetics.

In view of the above, it will be appreciated that there exists a need in the art for a coated article including a low-E coating that is designed to reduce fingerprints on the exterior surface of the coating. It would also be desirable to provide such a coating that also achieves one or more of: high visible transmission, low emissivity, thermal stability upon optional heat treatment such as thermal tempering, a low U-value, and desirable coloration and/or reflectivity values.

In certain example embodiments of this invention, it has surprisingly been found that the provision of a low-E coating with a multilayer overcoat that includes a layer comprising an oxide of zirconium (e.g., $ZrO_2$) sandwiched between and contacting first and second layers of or including silicon nitride (e.g., $Si_3N_4$, $SiO_xN_y$, $SiZrO_xN_y$, or the like), can solve the above problems. The layers of or including silicon nitride may be doped with metal such as aluminum in certain example embodiments. In the overcoat, the uppermost layer comprising silicon nitride modifies the surface energy of the layer comprising the oxide of zirconium (e.g., $ZrO_2$) so as to make the uppermost surface of the coating more hydrophilic, thereby reducing or minimizing interaction between zirconium oxide and finger oil to reduce fingerprints on the uppermost surface of the coating. In this respect, the uppermost layer comprising silicon nitride causes the contact angle of the coating to decrease (compared to if the uppermost layer comprising silicon nitride was not provided, and thus compared to if the zirconium oxide was the uppermost layer of the coating) thereby improving wettability and cleanability of the coated article. For example, in certain example embodiments, the uppermost layer comprising silicon nitride provided over the layer comprising zirconium oxide causes the contact angle of the coating to decrease (compared to if the uppermost layer comprising silicon nitride was not provided, and thus compared to if the zirconium oxide was the uppermost layer of the coating) by at least 15 degrees, more preferably by at least 20 degrees, and most preferably by at least 25 degrees (e.g., from about 70 degrees to about 35 degrees). The overcoat represents improvements for fabrication, and reduces fingerprints, while maintaining anti-scratch characteristics provided by at least the zirconium oxide. Coated articles herein may be used in the context of insulating glass (IG) window units, or in other suitable applications such as monolithic window applications, laminated windows, and/or the like.

In certain example embodiments of this invention, there is provided a coated article including a coating supported by a glass substrate, the coating comprising moving away from the glass substrate: a layer comprising zinc oxide located on the glass substrate; an infrared (IR) reflecting layer comprising silver located on the glass substrate over and directly contacting the layer comprising zinc oxide; a layer comprising metal oxide located over at least the IR reflecting layer comprising silver; and a multilayer overcoat comprising a first layer comprising silicon nitride, a layer comprising an oxide of zirconium, and a second layer comprising silicon nitride, the second layer comprising silicon nitride being further from the glass substrate than is the first layer comprising silicon nitride, wherein the layer comprising the oxide of zirconium is located between and directly contacting the first and second layers comprising silicon nitride.

BRIEF DESCRIPTION OF THE DRAWINGS

FIG. 5 is a chart illustrating Examples 2312, 2314-2319, and 2322-2324, where "d" represents thicknesses of the various layers in nanometers (nm).

DETAILED DESCRIPTION OF EXAMPLE EMBODIMENTS OF THE INVENTION

Figure 1:
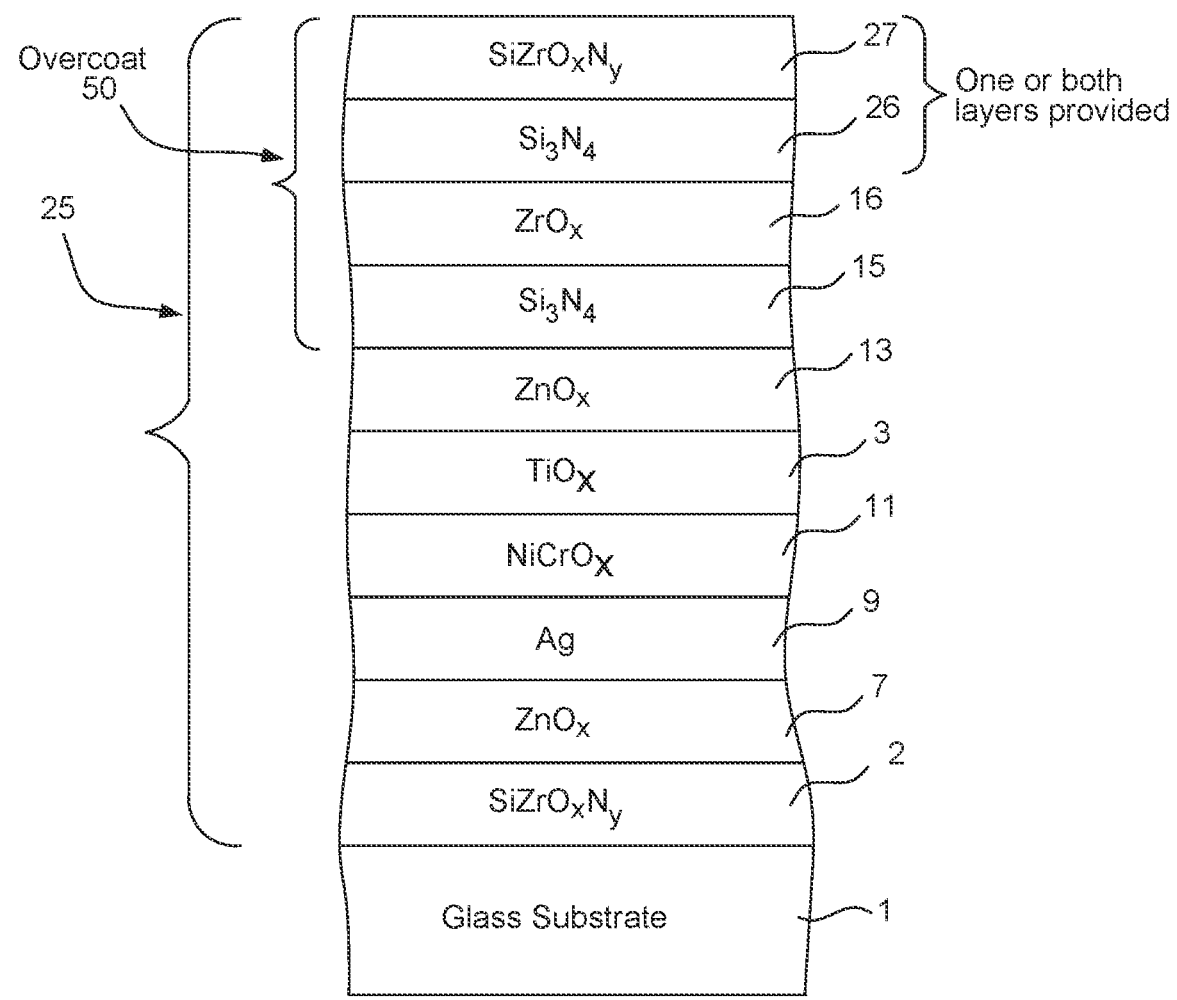
FIG. 1 is a cross sectional view of a coated article according to an example embodiment of this invention.

Referring now to the drawings in which like reference numerals indicate like parts throughout the several views.

Coated articles herein may be used in applications such as monolithic windows, IG window units that include a monolithic coated article, vehicle windows, and/or any other suitable application that includes single or multiple substrates such as glass substrates.

Certain embodiments of this invention relate to a coated article having a low-emissivity (low-E) coating supported by a glass substrate, the low-E coating including at least one infrared (IR) reflecting layer 9 of or including silver or the like. The low-E coating is designed so that the coated article can realize one or more of: high visible transmission, consistent and low emissivity values, thermal stability upon optional heat treatment such as thermal tempering, a low U-value, and desirable coloration and/or reflectivity values.

There exists a need in the art for a coated article including a low-E coating that is designed to reduce fingerprints on the exterior surface of the coating. It would also be desirable to provide such a coating that also achieves one or more of: high visible transmission, low emissivity, thermal stability upon optional heat treatment such as thermal tempering, a low U-value, and desirable coloration and/or reflectivity values.

Fingerprints on the coating may be caused by oil residues from the operator gloves during handling the glass after cutting, for example, or from oil on an operator's or handler's finger(s). Many washer settings cannot remove these fingerprints; an additional work step involving cleaning with alcohol is needed, and this reduces yields. Moreover, the user of silicon nitride alone as an overcoat (not over zirconium oxide) also shows such fingerprints, but not as strongly. And the user of silicon nitride alone as an overcoat has degraded mechanical durability performance. Thus, in certain example embodiments of this invention, a goal is to provide an overcoat structure which reduces visible fingerprints while maintaining a sufficient mechanical durability.

Figure 2:
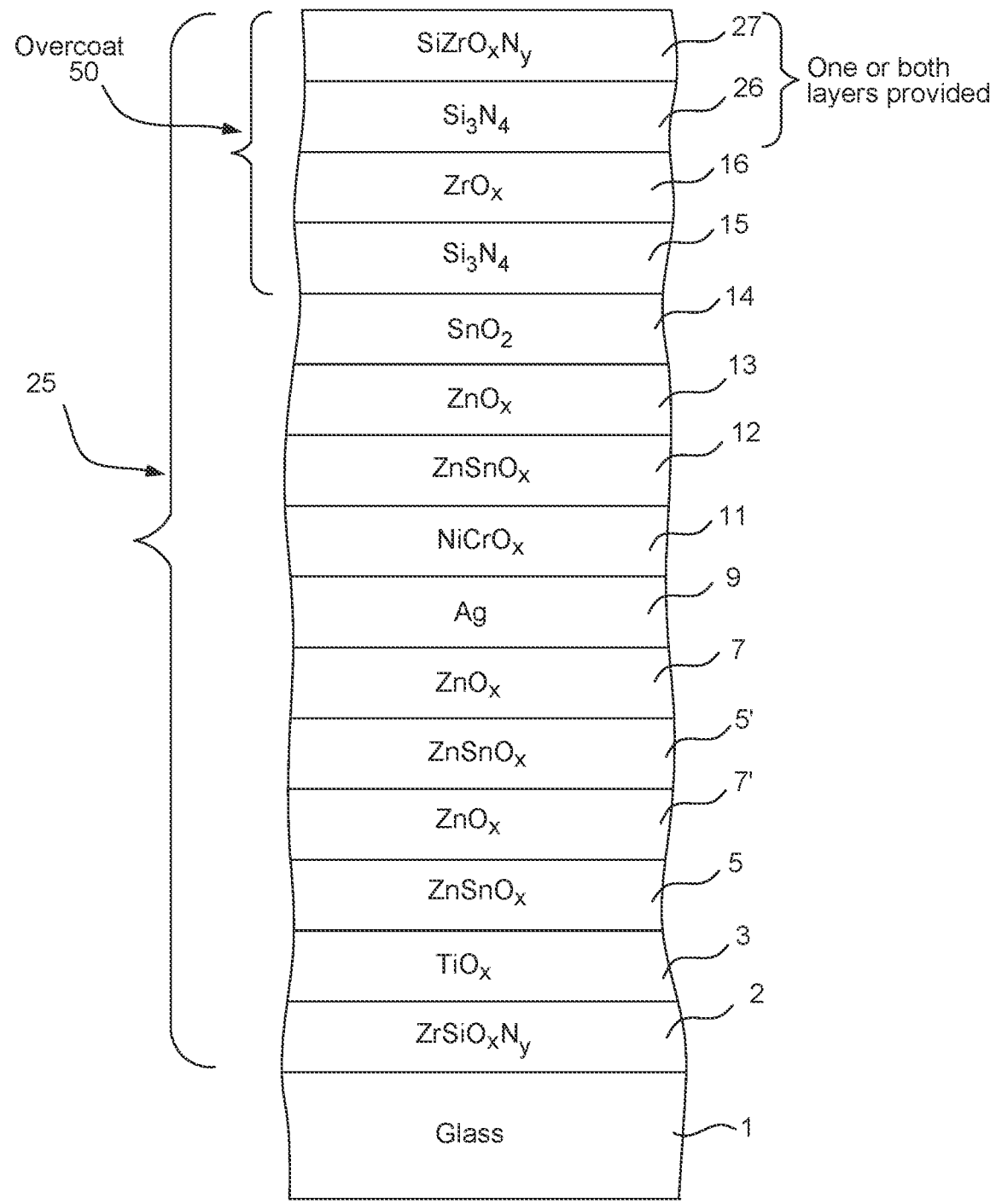
FIG. 2 is a cross sectional view of a coated article according to another example embodiment of this invention.
Figure 3:
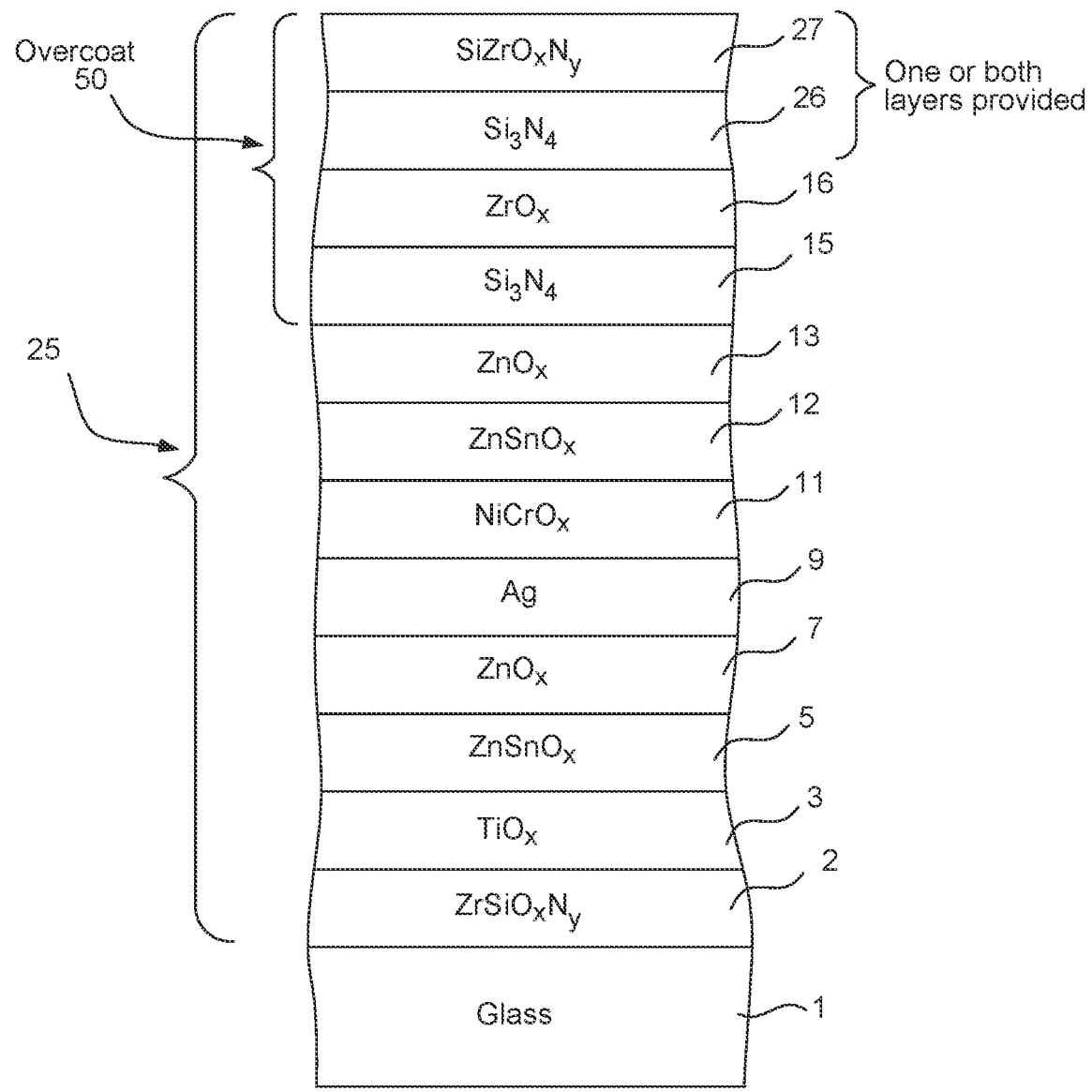
FIG. 3 is a cross sectional view of a coated article according to another example embodiment of this invention.

Referring to FIGS. 1-3 for example, in certain example embodiments of this invention, it has surprisingly been found that the provision of a low-E coating 25 with a multilayer overcoat 50 that includes a layer comprising an oxide of zirconium (e.g., $ZrO_2$) 16 sandwiched between and contacting first (15) and second (26 and/or 27) layers of or including silicon nitride (e.g., $Si_3N_4$, $SiO_xN_y$, $SiZrO_xN_y$, or the like), can solve the above problems. In the overcoat 50, the uppermost layer comprising silicon nitride (26 and/or 27) modifies the surface energy of the layer comprising the oxide of zirconium (e.g., $ZrO_2$) 16 so as to make the uppermost surface of the coating 25 more hydrophilic, thereby reducing or minimizing interaction between zirconium oxide 16 and finger oil to reduce fingerprints on the uppermost surface of the coating 25. In this respect, the uppermost layer comprising silicon nitride (layer 26 and/or 27) causes the contact angle of the coating 25 to decrease (compared to if the uppermost layer comprising silicon nitride 26 and/or 27 was not provided, and thus compared to if the zirconium oxide 16 was the uppermost layer of the coating 25) thereby improving wettability and cleanability of the coated article. The overcoat 50 represents improvements for fabrication, and reduces fingerprints, while maintaining anti-scratch characteristics provided by at least the zirconium oxide. Coated articles herein may be used in the context of insulating glass (TO) window units, or in other suitable applications such as monolithic window applications, laminated windows, and/or the like.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

FIGS. 1-3 illustrate different low-E coatings 25, each with a similar multilayer overcoat 50. Referring to FIGS. 1-3 for example, in certain example embodiments of this invention, it has surprisingly been found that the provision of a low-E coating 25 with a multilayer overcoat 50 that includes a layer comprising an oxide of zirconium (e.g., $ZrO_2$) 16 sandwiched between and contacting first (15) and second (26 and/or 27) layers of or including silicon nitride (e.g., $Si_3N_4$, $SiO_xN_y$, $SiZrO_xN_y$, or the like), can reduce fingerprints while maintaining durability. Surprisingly and unexpectedly, this is compared to both: (a) a situation where the overcoat is made up of only layers 15 and 16, and (b) a situation where the overcoat is made up of only silicon nitride layer 15. The layers of or including silicon nitride (15, and 26 and/or 27) may be doped with metal such as aluminum, Zr, or the like in certain example embodiments. The overcoat of FIGS. 1-3 may be made up of layers 15, 16 and 26 in certain example embodiments, or alternatively may be made up of layers 15, 16 and 27 in certain other example embodiments. Moreover, it is possible for both layers 26 and 27 to be present in the overcoat in certain example embodiments.

In the overcoat 50 of FIGS. 1-3, the uppermost layer comprising silicon nitride (26 and/or 27) modifies the surface energy of the layer comprising the oxide of zirconium (e.g., $ZrO_2$) 16 so as to make the uppermost surface of the coating 25 more hydrophilic, thereby reducing or minimizing interaction between zirconium oxide 16 and finger oil to reduce fingerprints on the uppermost surface of the coating 25. In this respect, the uppermost layer comprising silicon nitride (layer 26 and/or 27) causes the contact angle of the coating 25 to decrease (compared to if the uppermost layer comprising silicon nitride 26 and/or 27 was not provided, and thus compared to if the zirconium oxide 16 was the uppermost layer of the coating 25) thereby improving wettability and cleanability of the coated article. For example, in certain example embodiments, the uppermost layer comprising silicon nitride (26 and/or 27) provided over the layer comprising zirconium oxide 16 causes the contact angle of the coating 25 to decrease (compared to if the uppermost layer comprising silicon nitride was not provided, and thus compared to if the zirconium oxide was the uppermost layer of the coating) by at least 15 degrees, more preferably by at least 20 degrees, and most preferably by at least 25 degrees (e.g., from about 70 degrees to about 35 degrees).

Zirconium has a much higher electron affinity compared to silicon. Zirconium is non-polar. This means that silicon shows a higher polar character which again allows for a better mix with polar water. The wettability is better which means the surface can be cleaned better. This is supported by the free Gibbs—Enthalpy compared to silicon nitride. The metal oxygen can be formed from the energetic standpoint easier compared to nitrides. The Gibbs energy can also be seen as thermal dynamic potential in order to reach the chemical stable, minimal energy state. Since zirconium oxide is a good ion-conductor, the surface is constantly "working" to reach this energy minimum which could explain the saturation seen over time on the surface which leads to a change to hydrophobic surface. In addition, the $ZrO_x$ water contact angle may initially be rather hydrophilic, but increases over time into the hydrophobic region which makes the cleaning effort even worse.

Since ZrOx is not fully polar it may offer free vacancies as a good ion-conductor to surrounding oxygen from air, air-humidity, etc. This changes the surface chemistry. ZrOx is hydrophobic when exposed to the atmosphere. It has certain free vacancies which want to become saturated in order to reach the energy minimum. Energy minimum means low surface energy which means high contact angle. The overcoat 50 of certain example embodiments of this invention can solve these problems.

FIG. 1 is a cross sectional view of a coated article according to an example embodiment of this invention. The coated article includes glass substrate 1 (e.g., clear, green, bronze, or blue-green glass substrate from about 1.0 to 10.0 mm thick, more preferably from about 1.0 mm to 6.0 mm thick, with an example glass substrate being a clear glass substrate about 3.8 to 4.0 mm thick), and a multi-layer low-E coating (or layer system) 25 provided on the substrate 1 either directly or indirectly. As shown in FIG. 1, the coating 25 includes: dielectric layer of or including zirconium silicon oxynitride 2, dielectric layer 7 of or including zinc oxide (which may be doped with from about 1-8% Al for example), IR reflecting layer 9 of or including silver, gold, or the like, upper contact layer 11 of or including Ni, Cr, NiCr, NiCrMo, or any oxide thereof such as an oxide of NiCr or an oxide of NiCrMo, dielectric layer 3 of or including an oxide of titanium (e.g., $TiO_2$), dielectric layer 13 of or including a metal oxide such as zinc oxide or the like, dielectric layer 15 of or including silicon nitride (e.g., $Si_3N_4$ and/or silicon oxynitride, which may be doped with metal such as Al or the like), dielectric layer 16 of or including zirconium oxide (e.g., $ZrO_2$), dielectric layer 26 of or including silicon nitride (e.g., $Si_3N_4$, $SiO_xN_y$, or the like) which may be doped with from about 1-8% Al or the like. Dielectric layer 26 may be replaced with dielectric layer 27 of or including silicon nitride doped with yet another metal such as Zr, such as $SiZrO_xN_y$. The overcoat 50 is made up of layers 15 and 16, together with one or both of layers 26, 27. Other layers and/or materials may additionally be provided in certain example embodiments of this invention, and it is also possible that certain layers may be removed or split in certain example instances. For example, optionally a layer of or including silicon nitride and/or silicon oxynitride (not shown) may be provided between the glass substrate 1 and the zirconium silicon oxynitride 2. Moreover, other materials may be used for particular layers instead of the materials mentioned above in certain example embodiments of this invention.

The FIG. 2 embodiment is similar to the FIG. 1 embodiment, except that layers 3, 5, 7', 5', 12, and 14 are also present in the FIG. 2 embodiment. As shown in FIG. 2, the coating 25 of the FIG. 2 embodiment includes: dielectric layer of or including zirconium silicon oxynitride 2, dielectric layer of or including titanium oxide (e.g., $TiO_2$) 3, dielectric layers 5 and 5' of or including zinc stannate, dielectric layers 7 and 7' of or including zinc oxide, IR reflecting layer 9 of or including silver, gold, or the like, upper contact layer 11 of or including Ni, Cr, NiCr, NiCrMo, or any oxide thereof such as an oxide of NiCr or an oxide of NiCrMo, dielectric layer 12 of or including a metal oxide such as zinc stannate or the like, dielectric layer 13 of or including a metal oxide such as zinc oxide or the like, dielectric layer 14 of or including a metal oxide such as tin oxide (e.g., $SnO_2$), zinc stannate, or the like, dielectric layer 15 of or including silicon nitride (e.g., $Si_3N_4$ and/or $SiO_xN_y$, which may be doped with metal such as Al), dielectric layer 16 of or including zirconium oxide (e.g., $ZrO_2$), and dielectric layer 26 of or including silicon nitride (e.g., $Si_3N_4$, $SiO_xN_y$, or the like) which may be doped with from about 1-8% Al or the like. Dielectric layer 26 may be replaced with dielectric layer 27 of or including silicon nitride doped with yet another metal such as Zr, e.g., $SiZrO_xN_y$. The overcoat 50 is made up of layers 15 and 16, together with one or both of layers 26, 27.

FIG. 3 is a cross sectional view of a coated article according to another example embodiment of this invention. The FIG. 3 embodiment has the same layer stack as the FIG. 2 embodiment, except that layers 5', 7' and 14 from FIG. 2 are not present in the FIG. 3 embodiment. In the FIG. 3 embodiment, the silver-based IR reflecting layer may be thicker than in the FIG. 2 embodiment in certain instances so as to result in a coated article have a lower emissivity, lower sheet resistance, and lower U-value.

Figure 4:
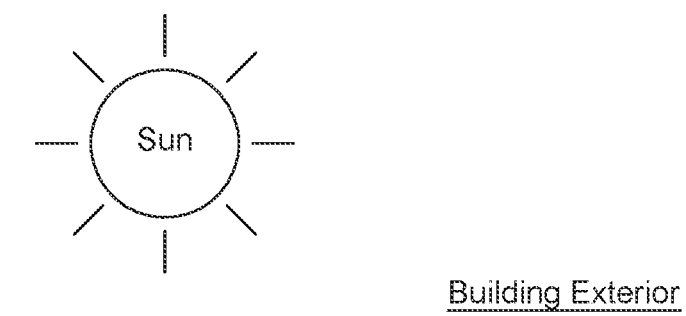
FIG. 4 is a cross sectional view of part of an insulating glass (IG) window unit including the monolithic coated article of FIG. 1, FIG. 2, or FIG. 3 according to an example embodiment of this invention.
Figure 4:
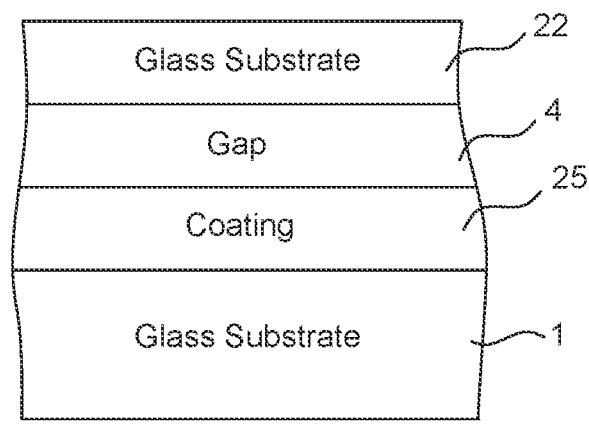

In monolithic instances, the coated article includes only one substrate such as glass substrate 1 (see FIGS. 1-3). However, monolithic coated articles herein may be used in devices such as IG window units for example. Typically, as shown in FIG. 4, an IG window unit may include two spaced apart glass substrates 1 and 22, with a gap 4 defined therebetween. Example IG window units are illustrated and described, for example, in U.S. Pat. Nos. 5,770,321, 5,800, 933, 6,524,714, 6,541,084 and US 2003/0150711, the disclosures of which are all hereby incorporated herein by reference. An example IG window unit as shown in FIG. 3 may include, for example, the coated glass substrate 1 shown in either FIG. 1 or FIG. 2 coupled to another glass substrate 22 via spacer(s), sealant(s) or the like with a gap 4 being defined therebetween. This gap 4 between the substrates in IG unit embodiments may in certain instances be filled with a gas such as argon (Ar), or a mixture of air and argon gas. An example IG unit may comprise a pair of spaced apart substantially clear glass substrates each about 4 mm (e.g., 3.8 mm) thick one of which is coated with a coating 25 herein in certain example instances, where the gap 4 between the substrates may be from about 5 to 30 mm, more preferably from about 10 to 20 mm, and most preferably about 16 mm. In certain example instances, the coating 25 may be provided on the side of the inner glass substrate 1 facing the gap (although the coating may be on the other substrate in certain alternative embodiments) as shown in FIG. 4, which is often referred to as surface three of the IG window unit.

In certain example IG unit embodiments of this invention, the coating 25 is designed such that the resulting IG unit (e.g., with, for reference purposes, a pair of 3.8 mm clear glass substrates 1, 22 spaced apart by 16 mm with a mixture of air and Ar gas in the gap) has a U-value of no greater than 1.4 W/(m$^2$K), more preferably no greater than 1.3 W/(m$^2$K), sometimes no greater than 1.1 W/(m$^2$K), and sometimes no greater than 1.0 W/(m$^2$K). U-value herein is measured and referred to in accordance with EN 410-673_2011—Winter, the disclosure of which is hereby incorporated herein by reference. Indeed, it is preferred that the optical and thermal features discussed herein are achieved when the coating 25 contains only one silver-based IR reflecting layer (e.g., as shown in FIGS. 1-2), as opposed to a double or triple-silver layer stack.

It has also surprisingly been found that the provision of a layer of or including zirconium silicon oxynitride 2, in combination with the zinc stannate and zinc oxide, in the lower dielectric portion of the coating 25, between the glass substrate 1 and the IR reflecting layer (e.g., of silver or the like) 9 unexpectedly improves the quality of the IR reflecting layer 9 thereby permitting the coated article to realized low emissivity values with lower tolerance variations. For example, a low emissivity value (e.g., 4%) with a plus/minus 1% tolerance can be surprisingly achieved using zirconium silicon oxynitride 2 in combination with the zinc stannate (5 and/or 5') and zinc oxide (7 and/or 7') between the glass substrate 1 and the IR reflecting layer; but emissivity within the 1% tolerance cannot be achieved without using this combination of layers. This is a surprisingly and unexpected improvement in the art. Even though the zirconium silicon oxynitride 2 is not directly contacting the IR reflecting layer 9, it still surprisingly improves the quality of the overlying IR reflecting layer 9 thereby permitting thermal properties of the coating to be improved and manufactured in a more consistent manner.

The nitrogen/oxygen ratio in the zirconium silicon oxynitride layer 2, 27 has been found to be significant. In particular, too much oxygen in zirconium silicon oxynitride layer 2, 27 results in a reduced sputter rate and does not seem to help reduce absorption or increase transmissions. Too much oxygen in this layer 2, 27 has also been found to result in undesirable haze. Accordingly, in certain example embodiments of this invention, the layer(s) 2 and/or 27 of or including zirconium silicon oxynitride has a nitrogen to oxygen ratio (nitrogen/oxygen ratio) of at least 1, and sometimes of at least 2, and sometimes of at least 3 or at least 4. Thus, layer 2 and/or layer 27 contains more N than O, such as for example at least 1.2 times more N than O, more preferably at least two times as much N than O, and most preferably at least three times as much N than O. For example in certain example embodiments, layer 2 and/or layer 27 may be sputter-deposited using a ZrSi target, using from about 0.4 to 2.0, more preferably from about 0.5 to 1.5, and most preferably about 0.8 to 1.0 ml/kW O$_2$ gas, and from about 4.0 to 10.0, more preferably from about 5.0 to 8.0, and most preferably from about 6.0 to 7.0 ml/kW N$_2$ gas. Argon (Ar) gas may also be used in the sputtering process.

Moreover, it has also been found that, in zirconium silicon oxynitride layer 2 and/or 27, too much Zr results in an undesirably brittle material and too little Zr causes the silver layer 9 to be not as smooth and degrades coating qualities. It has been found that better results in these respects are achieved when the layer 2 and/or 27 contains more Si than Zr (atomic %). For example, the Zr/Si (atomic) ratio in layer 2 and/or 27 (and in the sputtering target for depositing layer 2) is preferably from 0.20 to 0.60, more preferably from 0.30 to 0.47, and most preferably from 0.35 to 0.44. For example, a sputtering target(s) containing about 40% Zr and about 60% Si may be used to sputter-deposit layer 2.

Dielectric layer 3 may be of or include titanium oxide in certain example embodiments of this invention. The titanium oxide of layer 3 may in certain example instances be represented by TiO$_x$, where x is from 1.5 to 2.5, most preferably about 2.0. The titanium oxide may be deposited via sputtering or the like in different embodiments. In certain example instances, dielectric layer 3 may have an index of refraction (n), at 550 nm, of at least 2.0, more preferably of at least 2.1, and possibly from about 2.3 to 2.6 when the layer is of or includes titanium oxide. In certain embodiments of this invention, the thickness of titanium oxide inclusive layer 3 is controlled so as to allow a* and/or b* color values (e.g., transmissive, film side reflective, and/or glass side reflective) to be fairly neutral (i.e., close to zero) and/or desirable. Other materials may be used in addition to or instead of titanium oxide in certain example instances. In certain alternative embodiments, the Ti in oxide layer 3 may be replaced with another metal.

In example embodiments, the dielectric zinc stannate (e.g., ZnSnO, Zn$_2$SnO$_4$, or the like) based layers 5, 5' and/or 12 may include more Zn than Sn by weight. For example, the metal content of one or more of these zinc stannate based layers may include from about 51-90% Zn and from about 10-49% Sn, more preferably from about 51-70% Zn and from about 30-49% Sn, with an example being about 52% Zn and about 48% Sn (weight %, in addition to the oxygen in the layer) in certain example embodiments of this invention. Thus, for example, the zinc stannate based layers may be sputter-deposited using a metal target comprising about 52% Zn and about 48% Sn in certain example embodiments of this invention. Optionally, the zinc stannate based layer 14 may be doped with other metals such as Al or the like. In certain optional embodiments, it is possible to dope the zinc stannate (e.g., ZnSnO) with other materials such as Al, Zn, N, or the like. The zinc stannate based layers are substantially or substantially fully oxided in preferred embodiments of this invention.

Layers 7, 7', and 13 in certain embodiments of this invention are of or include zinc oxide (e.g., ZnO). The zinc oxide of these layers may contain other materials as well such as Al (e.g., to form ZnAlO$_x$). For example, in certain example embodiments of this invention, one or more of zinc oxide layers 7, 7', 13 may be doped with from about 1 to 10% Al, more preferably from about 1 to 5% Al, and most preferably about 1 to 4% Al. The zinc oxide layer(s) 7 and/or 7', in combination with the zinc stannate (5 and/or 5') and zirconium silicon oxynitride 2, helps improve silver quality of layer 9 and emissivity characteristics of the coating 25 as explained herein.

Dielectric layer 15 may be of or include silicon nitride in certain embodiments of this invention. Silicon nitride layer 15 may, among other things, improve heat-treatability of the coated articles, e.g., such as thermal tempering or the like, and may or may not include some oxygen. The silicon nitride of layer 15 may be of the stoichiometric type (i.e., Si$_3$N$_4$), or alternatively of the Si-rich type in different embodiments of this invention.

Infrared (IR) reflecting layer 9 is preferably substantially or entirely metallic and/or conductive, and may comprise or consist essentially of silver (Ag), gold, or any other suitable IR reflecting material. IR reflecting layer 9 helps allow the coating to have low-E and/or good solar control characteristics. The IR reflecting layers may, however, be slightly oxidized in certain embodiments of this invention and may optionally be doped with other material such as Pd or the like. Coating 25 preferably contains only one silver-based IR reflecting layer 9 in preferred embodiments of this invention.

The upper contact layer 11 may be of or include nickel (Ni) oxide, chromium/chrome (Cr) oxide, or a nickel alloy oxide such as nickel chrome oxide ($NiCrO_x$), or other suitable material(s) such as Ni, Ti or an oxide of Ti, or $NiTiO_x$, in certain example embodiments of this invention. The use of, for example, $NiCrO_x$ in these layers allows durability to be improved. The $NiCrO_x$ of these layers may be fully oxidized in certain embodiments of this invention (i.e., fully stoichiometric), or alternatively may only be partially oxidized (i.e., sub-oxide). In certain instances, the $NiCrO_x$ layer 11 may be at least about 50% oxidized. Descriptions of various types of oxidation graded contact layers that may optionally be used are set forth in U.S. Pat. No. 6,576,349, the disclosure of which is hereby incorporated herein by reference. Contact layer 11 may or may not be continuous in different embodiments of this invention across the entire underlying IR reflecting layer 9.

Transparent dielectric layer 14 may be of or include tin oxide in certain example embodiments of this invention. However, it may be doped with certain other materials in other example embodiments, such as with Al or Zn in certain example alternative embodiments.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1, FIG. 2, or FIG. 3 may be considered "on" and "supported by" the substrate 1 even if other layer(s) are provided between layer 2 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses may be used in different embodiments of this invention, example thicknesses and materials for the respective layers on the glass substrate 1 in the FIG. 1-3 embodiments are as follows, from the glass substrate 1 outwardly (e.g., the Al content in the zinc oxide layers may be from about 1-10%, more preferably from about 1-3% in certain example instances). For the FIG. 1 embodiment using Table 1 below, for example, consider that layers 3, 5, 7', 5', 12, and 14 are not present in the FIG. 1 embodiment.

TABLE 1

(Example Materials/Thicknesses; Fig. 1-3 Embodiments)

| Layer | Preferred Range (Å) | More Preferred (Å) | Example (Å) |
|---|---|---|---|
| $ZrSiO_xN_y$ (layer 2) | 40-250 (or 20-250) Å | 50-100 Å | 74 Å |
| $TiO_x$ (layer 3) | 15-150 Å | 20-60 Å | 30 Å |
| ZnSnO (layer 5) | 20-150 Å | 35-70 Å | 53 Å |
| $ZnAlO_x$ (layer 7') | 20-150 Å | 30-70 Å | 48 Å |
| ZnSnO (layer 5') | 15-150 Å | 25-60 Å | 41 Å |
| $ZnAlO_x$ (layer 7) | 60-170 Å | 80-140 Å | 123 Å |
| Ag (layer 9) | 50-120 Å | 70-100 Å | 87 Å |
| $NiCrO_x$ (layer 11) | 10-80 Å | 20-70 Å | 30 Å |
| ZnSnO (layer 12) | 30-130 Å | 50-80 Å | 66 Å |

TABLE 1-continued (Example Materials/Thicknesses; Fig. 1-3 Embodiments)

| Layer | Preferred Range (Å) | More Preferred (Å) | Example (Å) |
|---|---|---|---|
| $ZnAlO_x$ (layer 13) | 80-250 Å | 130-240 Å | 170 Å |
| $SnO_2$ (layer 14) | 15-150 Å | 30-80 Å | 55 Å |
| $Si_3N_4$ (layer 15) | 80-350 Å | 120-220 Å | 190 Å |
| $ZrO_2$ (layer 16) | 30-150 Å | 40-100 Å | 50-75 Å |
| $Si_3N_4$ (layer 26) | 20-120 Å | 25-60 Å | 30-50 Å |

The physical thicknesses for layer 27, if used instead of layer 26, may be the same as set forth for layer 26 above.

In certain example embodiments of this invention, coated articles according to the FIG. 1-3 embodiments herein may have the following characteristics set forth in Table 2 when measured monolithically or in an IG window unit, and these values refer to both heat treated and non-heat treated embodiments. Note that $E_n$ is normal emissivity/emittance.

TABLE 2

Low-E/Solar Characteristics (HT or non-HT)

| Characteristic | General | More Preferred | Most Preferred |
|---|---|---|---|
| $R_s$ (ohms/sq.): | <=8.0 | <=7.0 | <=5.0 |
| $E_n$: | <=7% | <=6% | <=5% or <=4% |

Moreover, coated articles including coatings according to the FIG. 1-3 embodiments of this invention have the following optical/color/thermal stability characteristics (e.g., when the coating(s) is provided on a clear soda lime silica glass substrate 1 from 1 to 10 mm thick, preferably about 4 mm thick such as 3.8 mm thick), as shown in Table 3 below. In Table 3, all parameters are measured monolithically. Note that "f" stands for film side, and "g" stands for glass side. Thus, $R_fY$ is film side reflectance, which is visible reflectance measured form the film side of the coated substrate. And $R_gY$ is glass side reflectance, which is visible reflectance measured form the glass side of the coated substrate. Film side reflectance, and film side reflective color values $a^*_f$ and $b^*_f$ are typically deemed to be the most important when the coating 25 is provided on surface three of an IG window unit because this indicates how the outside of the building will appear. Note that $\Delta E^*$ is a value indicative of thermal stability, and in particular how much the optical characteristics changes upon heat treatment (HT). The lower a $\Delta E^*$ value, the less the applicable $a^*$, $b^*$ and $L^*$ values change upon HT (e.g., thermal tempering). The low $\Delta E^*$ values of the coatings discussed herein demonstrate that HT and non-HT versions of each coating substantially matching with respect to coloration. Note that the equation for determining $\Delta E^*$ is known in the art and is described for example in U.S. Pat. No. 8,263,227, the disclosure of which is hereby incorporated herein by reference. It has surprisingly been found that the combination of the zinc stannate, zinc oxide, and zirconium silicon oxynitride in the lower dielectric stack reduces $\Delta E^*$ values in a desirable manner making the coatings more thermally stable. Note that coating 25 may be provided on either surface #2 or surface #3 of an IG window unit.

TABLE 3

Example Optical Characteristics (Monolithic, HT or non-HT)

| Characteristic | General | More Preferred |
|---|---|---|
| $T_{vis}$ (or TY) (Ill. C, 2 deg.): | >=60 or 75% | >=80% or >=86% |
| $a^*_t$ (Ill. C, 2°): | −5.0 to +1.0 | −3.0 to 0.0 |
| $b^*_t$ (Ill. C, 2°): | −2.0 to +6.0 | 0.0 to +4.0 |
| $R_fY$ (Ill. C, 2 deg.): | <=18% | <=8% or <=6% |
| $a^*_f$ (Ill. C, 2°): | −5.0 to +8.0 | −2.0 to +3.0 |
| $b^*_f$ (Ill. C, 2°): | −14.0 to +10.0 | −11.0 to +1.0 |
| $\Delta E^*_f$: | <=4.0 or <=2.0 | <=1.5 |
| $R_gY$ (Ill. C, 2 deg.): | <=20% | <=8% |
| $a^*_g$ (Ill. C, 2°): | −5.0 to +5.0 | −2.0 to +3.0 |
| $b^*_g$ (Ill. C, 2°): | −15.0 to +10.0 | −11.0 to 0 |
| $\Delta E^*_g$: | <=2.5 or <=2.0 | <=1.5 |

Moreover, coated articles including coatings according to the FIG. 1-3 embodiments have the following optical characteristics when the coated article is provided in an IG window unit in certain example embodiments (see Table 4 below). These measurements are with respect to, for example and for purposes of reference, coating 25 being provided in an IG window unit where both glass substrates 1, 22 are clear soda lime silica glass substrates about 3.8 mm thick, coating 25 is on surface three of the IG unit as shown in FIG. 3, and when the gap between the substrates is about 16 mm thick and is filled with a mixture of air and argon gas. Note that U-value is measured and referred to in accordance with EN 410-673_2011—Winter.

TABLE 4

Example Optical Characteristics (IG Unit; HT or non-HT)

| Characteristic | General | More Preferred |
|---|---|---|
| $T_{vis}$ (or TY) (Ill. C, 2 deg.): | >=68% or >=70% | >=78% or >=79% |
| $a^*_t$ (Ill. C, 2°): | −5.0 to +1.0 | −3.0 to 0.0 |
| $b^*_t$ (Ill. C, 2°): | −2.0 to +6.0 | 0.0 to +4.0 |
| $R_{outside}Y$ (Ill. C, 2 deg.): | <=25% | <=14% |
| $a^*_{outside}$ (Ill. C, 2°): | −5.0 to +8.0 | −2.0 to +3.0 |
| $b^*_{outside}$ (Ill. C, 2°): | −10.0 to +10.0 | −7.0 to +4.0 |
| $R_{interior}Y$ (Ill. C, 2 deg.): | <=25% | <=14% |
| $a^*_{interior}$ (Ill. C, 2°): | −5.0 to +305.0 | −2.0 to +3.0 |
| $b^*_{interior}$ (Ill. C, 2°): | −12.0 to +10.0 | −7.0 to 0 |
| U-value (W/(m²K)): | <=1.4 or <=1.3 | <=1.1 or <=1.0 |

EXAMPLES

Examples 2312, 2314-2319, and 2322-2324 are provided for purposes of example only, and are not intended to be limiting. All layers were deposited in the glass substrate 1 via sputtering. Examples 2312, 2314-2319, and 2322-2324 are set forth in FIG. 5 of the instant application, where "d" represents thicknesses of the various layers in nm. Examples 2312 is a first Comparative Example, and includes the layers shown in FIG. 1 except for layers 16, 26 and 27. Examples 2314 is a second Comparative Example, and includes the layers shown in FIG. 1 except for layers 26 and 27. Thus Comparative Examples 2312 and 2314 in FIG. 5 demonstrate what occurs when at least layers 26-27 are not present. Examples 2315-2316 include the layers of FIG. 1, except that layer 27 is not present. Examples 2318-2319 and 2323-2324 include the layers of FIG. 1, except that layer 26 is not present, and layer 27 is of SiZrON with more N than O. Layer 13 is omitted in Comparative Examples 2317 and 2322.

It can be seen from FIG. 5 that the provision of layer 26 or 27 over zirconium oxide layer 16 surprisingly resulted in a lower contact angle and reduced fingerprints. In the three right-most columns of FIG. 5, low values are good ("1" being the best), and high values are bad ("4" being the worst). The dry brush test is indicative of durability, as is the wet brush test. And the fingerprint test is indicative of fingerprints, with a low value of "1" or "2" indicating less fingerprints compared to a higher value of "3" or "4".

It can be seen in FIG. 5 that Comparative Example 2312 (overcoat of just layer 15) suffered from bad durability, as evidenced by the "4" value for the dry brush test. And Comparative Example 2314 (overcoat of just layers 15-16) suffered from too many fingerprints, as evidenced by the "3" value for the fingerprint test (due to high contact angle).

Thus, it will be appreciated from FIG. 5 that Example 2316 was surprisingly able to realize both a good fingerprint test result of "1" indicating very few/little fingerprints, and a dry brush test result of "2" indicating good mechanical durability. Low contact angle means less fingerprints.

Comparative Example 2314 had a high contact angle of about 80 degrees, which results in too many fingerprints. Meanwhile, Examples 2315-2316 (FIG. 1 stack, except that layer 27 is not present) and Examples 2318-2319 and 2323-2324 (FIG. 1 stack, except that layer 26 is not present, and layer 27 is of SiZrON with more N than O) realized contact angles of about 42, 38, 56, 57, 55 and 54 degrees, respectively, indicating less fingerprints and significant improvement relative to Comparative Example 2314.

Thus, it will be appreciated from the Examples and Comparative Examples of FIG. 5 that uppermost layer comprising silicon nitride (26 or 27) modifies the surface energy of the layer comprising the oxide of zirconium 16 so as to make the uppermost surface of the coating more hydrophilic, thereby reducing or minimizing interaction between zirconium oxide and finger oil to reduce fingerprints on the uppermost surface of the coating, while maintaining good mechanical durability.

In certain example embodiments of this invention, there is provided a coated article including a coating supported by a glass substrate, the coating comprising moving away from the glass substrate: a layer comprising zinc oxide located on the glass substrate; an infrared (IR) reflecting layer comprising silver located on the glass substrate over and directly contacting the layer comprising zinc oxide; a layer comprising metal oxide located over at least the IR reflecting layer comprising silver; and a multilayer overcoat comprising a first layer comprising silicon nitride, a layer comprising an oxide of zirconium, and a second layer comprising silicon nitride, the second layer comprising silicon nitride being further from the glass substrate than is the first layer comprising silicon nitride, wherein the layer comprising the oxide of zirconium is located between and directly contacting the first and second layers comprising silicon nitride.

In the coated article of the immediately preceding paragraph, the second layer comprising silicon nitride provided over the layer comprising zirconium oxide may cause an initial contact angle of the coating to decrease, compared to if the second layer comprising silicon nitride was not present and compared to if the layer comprising zirconium oxide was the uppermost layer of the coating, by at least 15 degrees, more preferably by at least 20 degrees, and most preferably by at least 25 degrees.

The coating of any of the preceding two paragraphs may have an initial contact angle of no greater than 60 degrees, more preferably an initial contact angle of no greater than 50 degrees, more preferably an initial contact angle of no greater than 45 degrees, and most preferably an initial contact angle of no greater than 40 degrees.

For the coated article of any of the preceding three paragraphs, the second layer comprising silicon nitride may be an outermost layer of the coating and may be exposed to ambient atmosphere.

For the coated article of any of the preceding four paragraphs, the coating may further include a dielectric layer comprising zirconium silicon oxynitride located between at least the glass substrate and the layer comprising zinc oxide.

For the coated article of any of the preceding five paragraphs, in certain example embodiments the coating contains only one silver based IR reflecting layer, and the coating may have a normal emissivity ($E_n$) of no greater than 7% and/or measured monolithically the coated article may have a visible transmission of at least 75%.

For the coated article of any of the preceding six paragraphs, the second layer comprising silicon nitride may further comprise oxygen.

For the coated article of any of the preceding seven paragraphs, the second layer comprising silicon nitride may further comprise Zr and/or Al.

For the coated article of any of the preceding eight paragraphs, the first layer comprising silicon nitride may physically be from 120-220 Å (angstroms) thick.

For the coated article of any of the preceding nine paragraphs, the layer comprising zirconium oxide may physically be from 40-100 Å (angstroms) thick.

For the coated article of any of the preceding ten paragraphs, the second layer comprising silicon nitride may physically be from 25-60 Å (angstroms) thick.

An IG window unit may include the coated article of any of the preceding eleven paragraphs, wherein the IG window unit may have a U-value of no greater than 1.4. The IG window unit may further comprise another glass substrate, and wherein the coating is on surface two or surface three of the IG window unit.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising moving away from the glass substrate:
    a layer comprising zinc oxide located on the glass substrate;
    an infrared (IR) reflecting layer comprising silver located on the glass substrate over and directly contacting the layer comprising zinc oxide;
    a layer comprising metal oxide located over at least the IR reflecting layer comprising silver; and
    a multilayer overcoat comprising a first layer comprising silicon nitride, a layer comprising an oxide of zirconium, and a second layer comprising silicon nitride, the second layer comprising silicon nitride being further from the glass substrate than is the first layer comprising silicon nitride, wherein the layer comprising the oxide of zirconium is located between and directly contacting the first and second layers comprising silicon nitride, and wherein the second layer comprising silicon nitride is the uppermost layer of the coating, and the silicon nitride is exposed to ambient atmosphere after the coated article is made;
    wherein the coated article, measured monolithically, has a visible transmission of at least 75%.

2. The coated article of claim 1, wherein the second layer comprising silicon nitride provided over the layer comprising zirconium oxide causes a contact angle of the coating to decrease, compared to if the second layer comprising silicon nitride was not present and compared to if the layer comprising zirconium oxide was the uppermost layer of the coating, by at least 15 degrees.

3. The coated article of claim 1, wherein the second layer comprising silicon nitride provided over the layer comprising zirconium oxide causes a contact angle of the coating to decrease, compared to if the second layer comprising silicon nitride was not present and compared to if the layer comprising zirconium oxide was the uppermost layer of the coating, by at least 20 degrees.

4. The coated article of claim 1, wherein the second layer comprising silicon nitride provided over the layer comprising zirconium oxide causes a contact angle of the coating to decrease, compared to if the second layer comprising silicon nitride was not present and compared to if the layer comprising zirconium oxide was the uppermost layer of the coating, by at least 25 degrees.

5. The coated article of claim 1, wherein the coating has a contact angle of no greater than 60 degrees.

6. The coated article of claim 1, wherein the coating has a contact angle of no greater than 50 degrees.

7. The coated article of claim 1, wherein the coating has a contact angle of no greater than 45 degrees.

8. The coated article of claim 1, wherein the coating has a contact angle of no greater than 40 degrees.

9. The coated article of claim 1, further comprising a dielectric layer comprising zirconium silicon oxynitride located between at least the glass substrate and the layer comprising zinc oxide.

10. The coated article of claim 1, wherein the coating contains only one silver based IR reflecting layer, and wherein the coating has a normal emissivity (En) of no greater than 7%.

11. The coated article of claim 1, wherein the second layer comprising silicon nitride further comprising oxygen.

12. The coated article of claim 1, wherein the second layer comprising silicon nitride further comprises Zr.

13. The coated article of claim 1, wherein the second layer comprising silicon nitride further comprises Al.

14. The coated article of claim 1, wherein the first layer comprising silicon nitride is physically from 120-220 Å (angstroms) thick.

15. The coated article of claim 1, wherein the layer comprising zirconium oxide is physically from 40-100 Å (angstroms) thick.

16. The coated article of claim 1, wherein the second layer comprising silicon nitride is physically from 25-60 Å (angstroms) thick.

17. The coated article of claim 1, wherein the coating further comprises a layer comprising tin and oxygen located between at least the layer comprising metal oxide and the multilayer overcoat.

18. An IG window unit comprising the coated article of claim 1, wherein the IG window unit has a U-value of no greater than 1.4, the IG window unit further comprising another glass substrate, and wherein the coating is on surface two or surface three of the IG window unit.

19. An IG window unit comprising the coated article of claim 1, wherein the IG window unit has a U-value of no greater than 1.1, the IG window unit further comprising another glass substrate, and wherein the coating is on surface three of the IG window unit.

20. The coated article of claim 1, wherein the second layer comprising silicon nitride comprises a first layer portion comprising silicon nitride and a second layer portion comprising Zr and silicon nitride, and the second layer portion comprising more Zr than the first layer portion, wherein the first layer portion is located between at least the layer comprising the oxide of zirconium and the second layer portion comprising Zr and silicon nitride.

21. A coated article including a coating supported by a glass substrate, the coating comprising moving away from the glass substrate:
- a layer comprising zinc oxide located on the glass substrate;
- an infrared (IR) reflecting layer comprising silver located on the glass substrate over and directly contacting the layer comprising zinc oxide;
- a layer comprising metal oxide located over at least the IR reflecting layer comprising silver; and
- a multilayer overcoat comprising a first layer comprising silicon nitride, a layer comprising an oxide of zirconium, and a second layer comprising silicon nitride, the second layer comprising silicon nitride being further from the glass substrate than is the first layer comprising silicon nitride, wherein the layer comprising the oxide of zirconium is located between and directly contacting the first and second layers comprising silicon nitride, and wherein the second layer comprising silicon nitride is the uppermost layer of the coating, and silicon nitride is exposed to ambient atmosphere after the coated article is made;

wherein the coated article, measured monolithically, has a visible transmission of at least 60%;

wherein the second layer comprising silicon nitride comprises a first layer portion comprising silicon nitride and a second layer portion comprising Zr and silicon nitride, the second layer portion comprising more Zr than the first layer portion, wherein the first layer portion is located between at least the layer comprising the oxide of zirconium and the second layer portion comprising Zr and silicon nitride.

* * * * *